(12) United States Patent
Tanada (10) Patent No.: US 11,724,547 B2
(45) Date of Patent: Aug. 15, 2023

(54) HEAVY DUTY PNEUMATIC TIRE (71) Applicant: Sumitomo Rubber Industries, Ltd., Hyogo (JP)

(72) Inventor: Kenichiro Tanada, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 288 days.

(21) Appl. No.: 17/059,089

(22) PCT Filed: Jun. 19, 2019

(86) PCT No.: PCT/JP2019/024202
§ 371 (c)(1),
(2) Date: Nov. 25, 2020

(87) PCT Pub. No.: WO2019/244912
PCT Pub. Date: Dec. 26, 2019

(65) Prior Publication Data
US 2021/0229501 A1 Jul. 29, 2021

(30) Foreign Application Priority Data
Jun. 19, 2018 (JP) ................................. 2018-116299

(51) Int. Cl.
*B60C 11/01* (2006.01)
*B60C 11/00* (2006.01)
*B60C 13/00* (2006.01)

(52) U.S. Cl.
CPC ............ *B60C 11/01* (2013.01); *B60C 11/005* (2013.01); *B60C 2011/0025* (2013.01); *B60C 2013/006* (2013.01); *B60C 2200/06* (2013.01)

(58) Field of Classification Search
CPC ....... B60C 2013/006; B60C 2011/0025; B60C 11/005; B60C 11/01
See application file for complete search history.

(56) References Cited

U.S. PATENT DOCUMENTS 4,079,768 A 3/1978 Verdier
5,120,209 A * 6/1992 MacMillan ........ B29D 30/0606
425/46
(Continued)

FOREIGN PATENT DOCUMENTS

JP H06-239109 A 8/1994
JP 2003-320817 A * 11/2003
(Continued)

OTHER PUBLICATIONS

Machine translation for Japan 2009-208641 (Year: 2022).*
(Continued)

*Primary Examiner* — Steven D Maki
(74) *Attorney, Agent, or Firm* — Studebaker & Brackett PC (57) ABSTRACT

A heavy duty pneumatic tire 1 has provided in a buttress region 10 thereof a protrusion 11 extending in the tire circumferential direction. In a tire meridian cross-section, the maximum protrusion height $h_{max}$ of the protrusion 11 from an imaginary buttress surface J is 3.0 mm or greater and is in the range of 0.025-0.050 times a half tread width Wt. The cross-sectional area Sa of the protrusion 11 protruding from the imaginary buttress surface J is 20 mm² or greater.

15 Claims, 5 Drawing Sheets (56) References Cited

U.S. PATENT DOCUMENTS

| | | | | |
|---|---|---|---|---|
| 6,330,896 B1* | 12/2001 | Nakasai | .................... | B60C 9/20 |
| | | | | 152/526 |
| 2007/0084533 A1* | 4/2007 | Numata | .................. | B60C 11/00 |
| | | | | 152/209.16 |
| 2018/0009274 A1 | 1/2018 | Kakuta | | |

FOREIGN PATENT DOCUMENTS

| | | | |
|---|---|---|---|
| JP | 2009-208641 A | * | 9/2009 |
| JP | 2009-280009 A | | 12/2009 |

OTHER PUBLICATIONS

Machine translation for Japan 2003-320817 (Year: 2022).*
The extended European search report issued by the European Patent Office dated Feb. 8, 2022, which corresponds to European Patent Application No. 19823295.1-1012 and is related to U.S. Appl. No. 17/059,089.
International Search Report issued in PCT/JP2019/024202; dated Sep. 17, 2019.

* cited by examiner

HEAVY DUTY PNEUMATIC TIRE

TECHNICAL FIELD

The present invention relates to a heavy duty pneumatic tire capable of improving wandering resistance performance.

BACKGROUND ART

When traveling on a rutted road surface with pneumatic tires for heavy load, the so-called wandering phenomenon in which the steering wheel is pull by the force applied to the shoulder portions is likely to occur.

The following Patent Documents 1 and 2 propose providing a narrow groove (the so-called wandering protection groove: WPG) that extends in the tire circumferential direction proximate the tread edge of the tread surface or the buttress region. This narrow groove is deformed in a direction that reduces the width of the groove in response to force applied to the tread shoulder portion when the tire overcomes ruts. Thus, the force applied to the tire is mitigated and wandering resistance is improved.

PRIOR ART DOCUMENTS

Patent Documents

Patent Document 1: Japanese Unexamined Patent Application Publication H06-239109
Patent Document 2: Japanese Unexamined Patent Application Publication 2009-280009

SUMMARY OF INVENTION

Technical Problem

However, when such a narrow groove is provided, rubber portion on the outside of the tire than the narrow groove becomes insufficient in strength, and there is a problem that damage such as rubber chipping occurs when it comes into contact with a curb.

The present invention has an object to provide a heavy duty pneumatic tire capable of improving wandering resistance performance without being provided with narrow grooves (WPG), by improving a protruding portion extending in the tire circumferential direction on the buttress region.

Solution to Problem

The present invention is a heavy duty pneumatic tire comprising a tread portion having a tread surface and a sidewall portion connected to the tread surface through a buttress region, wherein the buttress region is provided with a protruding portion protruding outwardly in a tire axial direction and extending in a tire circumferential direction, in a tire meridian cross-sectional view, a maximum protrusion height ($h_{max}$) of the protruding portion, with respect to an imaginary buttress surface in which outer surfaces other than the protruding portion in the buttress region are smoothly connected, is equal to or more than 3.0 mm and is in a range of 0.025 to 0.050 times a tread half width (Wt), and a cross-sectional area (Sa) of the protruding portion from the imaginary buttress surface is equal to or more than 20 mm$^2$.

In the heavy duty pneumatic tire according to the present invention, it is preferable that the protruding portion has a triangular cross-sectional shape comprising a top portion defining the maximum protrusion height ($h_{max}$), a radially inner inclined surface and a radially outer inclined surface each of which extends to the imaginary buttress surface from the top portion while decreasing its protrusion height.

In the heavy duty pneumatic tire according to the present invention, it is preferable that the inner inclined surface comprises a first arc surface that is connected to the imaginary buttress surface smoothly and that has a concave arc shape with radius of curvature (Ri), the outer inclined surface comprises a second arc surface that is connected to the imaginary buttress surface smoothly and that has a concave arc shape with radius of curvature (Ro), and the radii of curvature (Ri) and (Ro) are greater than 10 mm and smaller than 30 mm.

In the heavy duty pneumatic tire according to the present invention, it is preferable that the tread portion comprises, inside, belt layers comprising a first belt ply and a second belt ply that are superimposed from inwardly in a tire radial direction toward the tread surface in this order, and a height (La) in the tire radial direction from a tread grounding edge to the top portion of the protruding portion is in the range of 0.9 to 1.1 times a height (Lb) in the tire radial direction from the tread surface to an outer surface of an axially outer edge of the second belt ply.

In the heavy duty pneumatic tire according to the present invention, it is preferable that the tread portion is provided with a circumferential main groove extending in the tire circumferential direction with a groove depth (D), and a height (La) in the tire radial direction from a tread grounding edge to the top portion of the protruding portion is greater than the groove depth (D) of the circumferential main groove.

In the heavy duty pneumatic tire according to the present invention, it is preferable that the tread surface near a tread grounding edge and the buttress region are not provided with any narrow grooves extending continuously in the tire circumferential direction.

In the heavy duty pneumatic tire according to the present invention, it is preferable that the tire has an SOT structure in which an axially outer end portion of a tread rubber forming the tread surface is covered with a sidewall rubber forming an outer surface of the sidewall portion.

In the heavy duty pneumatic tire according to the present invention, it is preferable that an outermost end in the tire radial direction of a boundary surface between the tread rubber and the sidewall rubber is exposed to an outward location in the tire radial direction of the top portion of the protruding portion.

In the heavy duty pneumatic tire according to the present invention, it is preferable that a distance in the tire radial direction between the outermost end of the boundary surface and an outer intersection of the protruding portion with the imaginary buttress surface is less than 5 mm.

In the heavy duty pneumatic tire according to the present invention, it is preferable that the tread rubber comprises a cap rubber layer forming the tread surface and a base rubber layer being adjacent inwardly of the cap rubber layer in the tire radial direction, and on a first reference line (X1) that extends in parallel with the tread surface passing the top portion of the protruding portion, a thickness (ta) of the sidewall rubber is smaller than a thickness (tb) of the cap rubber layer.

In the heavy duty pneumatic tire according to the present invention, it is preferable that the sidewall rubber has loss tangent (tan δs) being greater than loss tangent (tan δc) of the cap rubber layer.

In the heavy duty pneumatic tire according to the present invention, it is preferable that the tread portion is provided with one or more shoulder lateral grooves having axially outer ends opening at the buttress region, and groove bottoms of the outer ends of the shoulder lateral grooves are located on the outer inclined surface of the protruding portion.

In the heavy duty pneumatic tire according to the present invention, it is preferable that a second reference line (X2) that extends in parallel with the tread surface and passing an outer intersection of the protruding portion and the imaginary buttress surface traverses the base rubber layer.

In the heavy duty pneumatic tire according to the present invention, it is preferable that loss tangent (tan δs) of the sidewall rubber is greater than loss tangent (tan δb) of the base rubber layer.

In the present invention, the "tread half width (Wt)" refers to a distance in the tire axial direction from the tire equator to a respective one of the tread grounding edges. The tread grounding edges mean positions of the outermost ends in the tire axial direction of the tread grounding surface which occurs on the road surface in a normal loaded condition in the tread surface. The normal loaded condition means a state in which a tire mounted on a normal rim with a normal internal pressure is loaded with a normal load.

The "normal rim" means a rim approved for each tire by a standard organization on which the tire is based, wherein the normal rim is the "standard rim" specified in JATMA, the "Design Rim" in TRA, and the "Measuring Rim" in ETRTO, for example. The "normal internal pressure" means the air pressure approved for each tire by the standard for each tire, wherein the standard pressure is the "maximum air pressure" in JATMA, the maximum pressure given in the "Tyre Load Limits at Various Cold Inflation Pressures" table in TRA, and the "Inflation Pressure" in ETRTO, for example. The normal load is a tyre load approved for each tyre by the standard in which the tyre is based, wherein the normal load is the "maximum load capacity" in JATMA, the maximum value given in the above-mentioned table in TRA, the "Load Capacity" in ETRTO, for example.

In the present invention, unless otherwise noted, dimensions or the like of respective parts of the tire are defined as values specified in a non-load state in which the tire is mounted on the normal rim with an internal pressure of 5% of the normal internal pressure but loaded with no tire load.

Advantageous Effects of Invention

In the present invention, as described above, the protruding portion extending in the tire circumferential direction is arranged on the buttress region. The maximum protrusion height ($h_{max}$) of the protruding portion, with respect to the imaginary buttress surface, is equal to or more than 3.0 mm and is in a range of 0.025 to 0.050 times the tread half width (Wt). Further, a cross-sectional area (Sa) of the protruding portion is equal to or more than 20 mm². Thus, the wandering performance can be improved.

The protruding portion functions as follows. When the shoulder portion gets over a rut and then receives force, intersections between the protruding portion and the imaginary buttress region become weak points of stiffness, and stress is concentrated thereto. Thus, the buttress region is easily bent and deformed with the intersections as a starting point, and the force applied to the tire can be relaxed. Thus, wandering performance can be improved.

When the protruding portion is not provided or when the height and cross-sectional area of the protruding portion are small, stress is hardly concentrated. As a result, the buttress region is hardly deformed, and the effect of improving wandering performance is difficult to expect.

DESCRIPTION OF EMBODIMENTS

Figure 1:
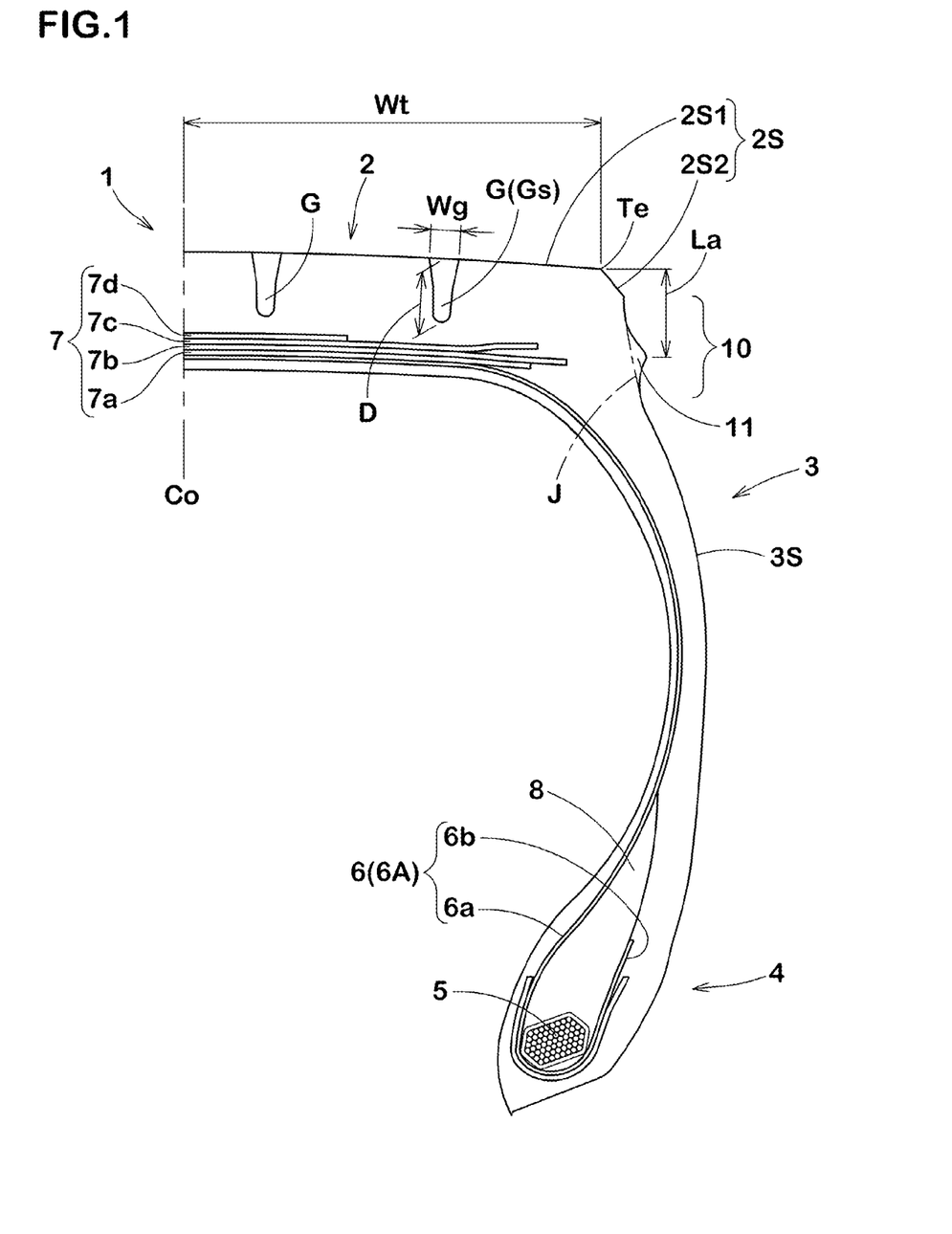
FIG. 1 is a meridian cross-sectional view of a heavy duty pneumatic tire according to an embodiment of the present invention.

Hereinafter, embodiments of the present invention will be described in detail. As shown in FIG. 1, a heavy duty pneumatic tire 1 (hereinafter referred to as "tire 1") according to the present embodiment includes a tread portion 2 having a tread surface 2S and a pair of sidewall portions 3 each connected to the tread surface 2S via a respective buttress region 10. A respective bead portion 4 is located on an inner end portion in the tire radial direction of the respective one of the sidewall portions 3. In this example, the tire 1 is shown as a radial tire for track or bus.

The tire 1 includes a carcass 6 extending from the tread portion 2 to bead cores 5 of the bead portions 4 through the sidewall portions 3 and a belt layer 7 disposed radially outwardly of the carcass 6 in the tread portion 2.

The carcass 6 includes one or more carcass plies, one carcass ply 6A in this example, having carcass cords oriented at an angle of from 70 to 90 degrees with respect to the tire circumferential direction. The carcass ply 6A of this example includes a toroidal ply main portion 6a extending between the bead cores 5 and 5, and a pair of turn-up portions 6b each turned up around a respective one of the bead cores 5. A bead apex rubber 8 that extends outwardly in the tire radial direction with a triangular cross-section is disposed between the ply main portion 6a and a respective one of the turn-up portions 6b.

The belt layer 7 is configured as a plurality of belt plies which includes a first belt ply 7a and a second belt ply 7b that overlap in order from the inside in the radial direction of the tire toward the tread surface 2S.

This example shows the belt layer 7 configured as four-ply structure that further includes a third belt ply 7c and a fourth ply 7d which are arranged outwardly of the second belt ply 7b. For example, the belt cords of the first belt ply 7a are oriented at an angle of 40 to 70 degrees with respect to the circumferential direction, and the belt cords of the second to fourth belt plies 7b to 7d, for example, are oriented at an angle of from 10 to 30 degrees. The inclination direction of the cords of the second belt ply 7b is different from that of the third belt ply 7c, thus belt stiffness can be enhanced. The second belt ply 7b is the widest in the plurality of belt plies.

The tread surface 2S, in this example, includes a tread grounding surface 2S1 that grounds when the normal loaded condition, and a tread shoulder surface 2S2 that is connected to the tread grounding surface 2S1.

Figure 3A:
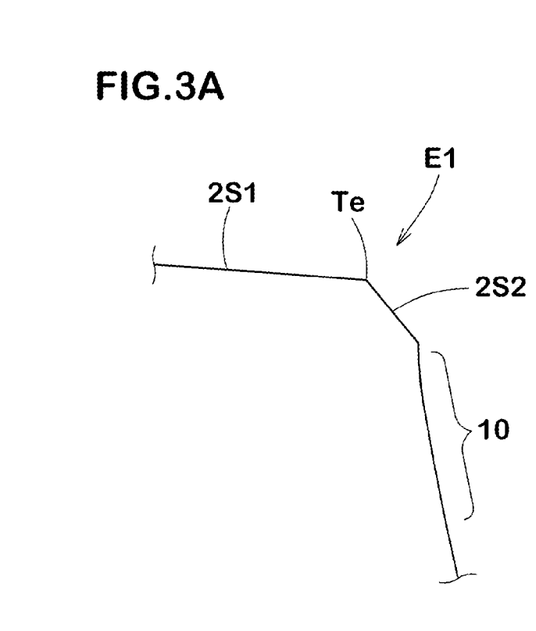
FIGS. 3A to 3C are partial cross-sectional views illustrating shoulder shapes of a tread portion.
Figure 3B:
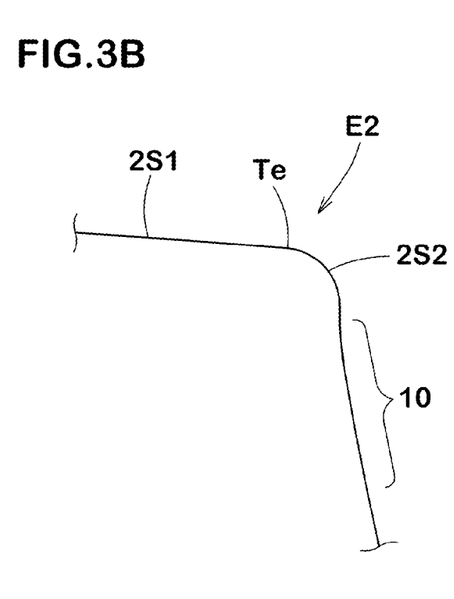
Figure 3C:
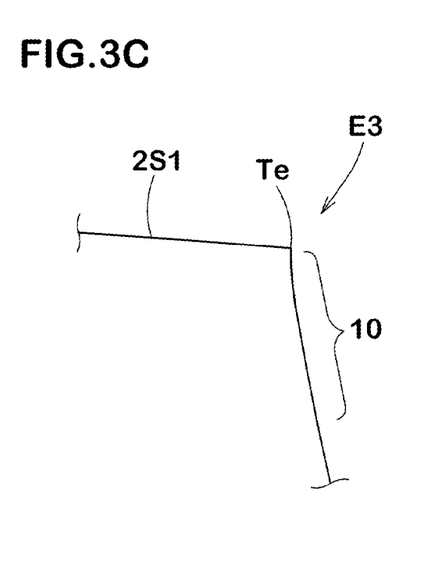

As shown in FIGS. 3A to 3C, when being a heavy duty pneumatic tire, generally, the tread portion 2, as its shoulder shape, may employ a taper shoulder E1 (FIG. 3A), a round shoulder E2 (FIG. 3B) or a square shoulder E3 (FIG. 3C). In the case of the taper shoulder E1, the tread shoulder surface 2S2 is formed as a slope connecting between a tread grounding edge Te and the buttress region 10. In the case of the round shoulder E2 (FIG. 3B), the tread shoulder surface 2S2 is formed as a convex arc surface connecting between the tread grounding edge Te and the buttress region 10. In the case of the square shoulder E3, no tread shoulder surface 2S2 is provided and the tread surface 2S is formed by only the tread grounding surface 2S1.

As shown in FIG. 1, an outer surface 3S (it may be referred to as a sidewall surface 3S) of each sidewall portion 3 has a contour shape of a convex arc shape having the center of radius of curvature located inside the tire. On the other hand, an imaginary buttress surface J of the buttress region 10 has a contour shape of a concave arc shape having the center of radius of curvature located outside the tire. Thus, the buttress region 10 is expressly distinguished from the tread portion 2 as well as from the sidewall portions 3.

The buttress region 10 is provided with a protruding portion 11 protruding outwardly in the tire axial direction and extending in the tire circumferential direction.

Figure 2:
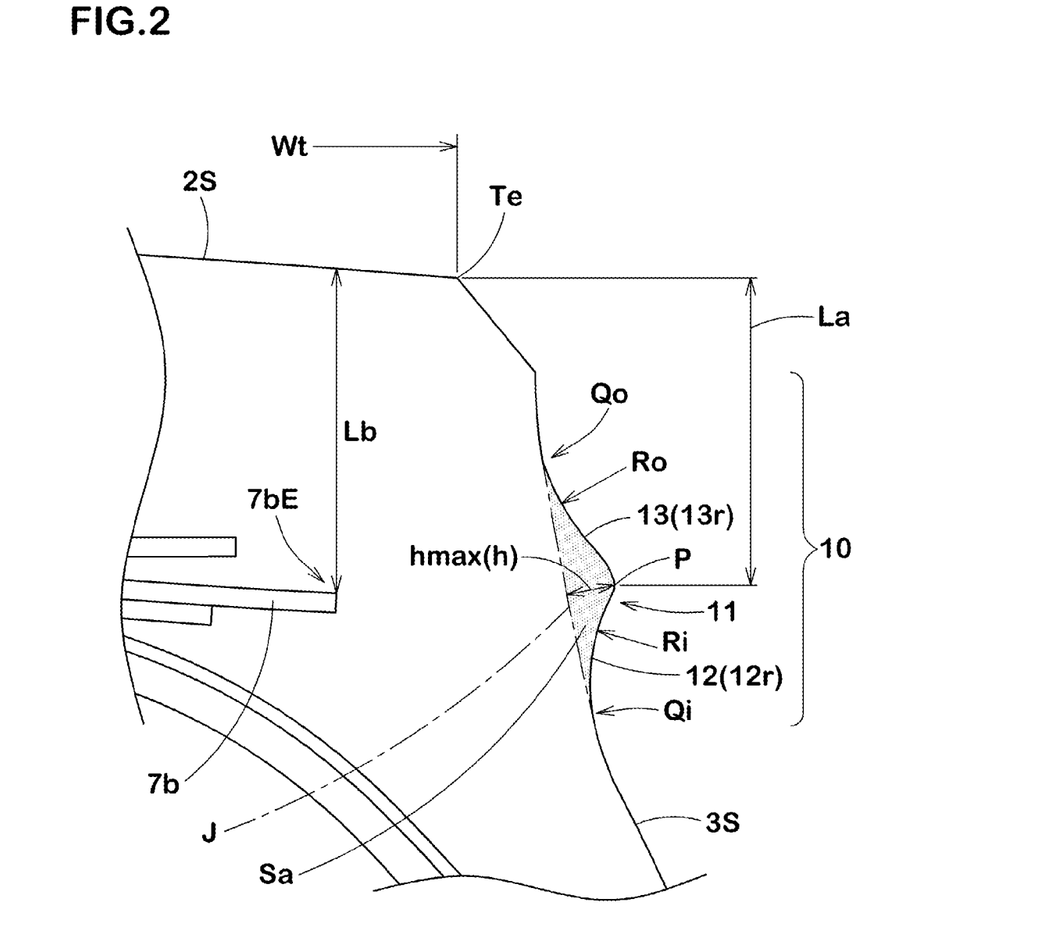
FIG. 2 is a partial enlarged cross-sectional view showing a protruding portion.

As shown in FIG. 2, in a tire meridian cross-sectional view, the protruding portion 11, in this example, has a triangular cross-sectional shape. Specifically, the protruding portion 11 includes a top portion P having a protrusion height h being the maximum, and a radially inner inclined surface 12 and a radially outer inclined surface 13 each of which extends to the imaginary buttress surface J from the top portion P while decreasing its protrusion height h.

Here, the "imaginary buttress surface J" is an imaginary surface in which outer surfaces other than the protruding portion 11 in the buttress region 10 are smoothly connected, and has the concave arc shape as described above.

The inner inclined surface 12 in this example includes a first arc surface 12r that is connected to the imaginary buttress surface J smoothly and that has a concave arc shape with radius of curvature Ri. Preferably, the first arc surface 12r occupies 60% or more of the inner inclined surface 12, and more preferably 70% or more.

Similarly, the outer inclined surface 13 of this example includes a second arc surface 13r that is connected to the imaginary buttress surface J smoothly and that has a concave arc shape with radius of curvature Ro. Preferably, the second arc surface 13r occupies 60% or more of the outer inclined surface 13, and more preferably 70% or more.

The protruding portion 11 has the maximum protrusion height $h_{max}$ with respect to the imaginary buttress surface J being equal to or more than 3.0 mm, and the maximum protrusion height $h_{max}$ is in a range of 0.025 to 0.050 times a tread half width (Wt).

Further, the protruding portion 11 has a cross-sectional area Sa from the imaginary buttress surface J being equal to or more than 20 mm$^2$.

The present inventor has found that wandering resistance performance can be improved by forming the protruding portion 11 relatively large as described above.

In the buttress region 10 provided with the relatively large protruding portion 11, radially inner and outer intersections Qi and Qo of the protruding portion 11 and the imaginary buttress surface J has a large stiffness variation. When the shoulder portion gets over a rut and then receives force, these intersections Qi and Qo becomes a weak point of stiffness, and stress is concentrated thereto. Thus, the buttress region 10 is easily bent and deformed with the intersections Qi and Qo as a starting point, and the force applied to the tire can be relaxed. Therefore, wandering performance can be improved. Further, since the buttress region 10 is easily deformed, grounding pressure on the tread grounding edge side is lowered, and the wear energy is also reduced. Thus, uneven wear resistance such as shoulder wear or the like can be prevented.

When the maximum protrusion height $h_{max}$ of the protruding portion 11 is less than 3.0 mm, when the maximum protrusion height $h_{max}$ is less than 0.025 times the tread half width Wt, or when the cross-sectional area Sa is less than 20 mm$^2$, the protruding portion 11 itself becomes small, and stress is hardly to concentrated on the intersections Qi and Qo. As a result, the buttress region 10 is hardly deformed, and the effect of improving wandering resistance performance cannot be expected.

When the maximum protrusion height $h_{max}$ become too high, the top portion P of the protruding portion 11 tends to be damaged due to contact with curbs and the like. Thus, the upper limit of the maximum protruding portion height $h_{max}$ is preferably equal to or less than 0.050 times the tread half width Wt, more preferably equal to or less than 0.040 times. Further, when the cross-sectional area Sa is too large, rigidity of the whole buttress region 10 is relatively increased. As a result, the buttress region 10 is hardly deformed, and the effect of improving wandering resistance performance tends to be lowered. Thus, the upper limit of the cross-sectional area Sa is preferably equal to or less than 45 mm$^2$.

The radius of curvature Ri of the first arc surface 12r and the radius of curvature Ro of the second arc surface 13r are preferably greater than 10 mm and smaller than 30 mm. When the radii of curvature Ri and Ro is equal to or less than 10 mm, cracks tend to occur on the intersections Qi and Qo. On the either hand, they exceed 30 mm, the buttress region 10 is hardly deformed, and the effect of improving wandering resistance performance tends to be reduced.

In the tire 1, a height La in the tire radial direction from the tread grounding edge Te to the top portion P of the protruding portion 11 is preferably in a range of 0.9 to 1.1 times a height Lb in the tire radial direction from the tread surface 2s to an outer surface of an axially outer edge 7bE of the second belt ply 7b. Thus, positions of the intersections Qi and Qo as the starting point of the bending deformation can be shifted from the position of the outer edge 7bE, and the deformation of the buttress region 10 can be made easier.

As described above, in the tire 1, an improvement effect of wandering resistance performance is imparted by the protruding portion 11 of a predetermined size provided in the buttress region 10. Therefore, there is no need to provide a narrow groove (WPG) continuously extending in the tire circumferential direction in the vicinity of the tread grounding edge Te of the tread surface 2S or the buttress region 10, and thus the occurrence of rubber chipping caused by the narrow groove (WPG) can be prevented. Note that the vicinity of the tread grounding edge Te refers to a region within a distance of 15 mm from the tread grounding edge Te.

As shown in FIG. 1, the tread portion 2 is provided with one or more circumferential main grooves G extending in the tire circumferential direction. This example shows that a plurality of, four for example, circumferential main grooves G are arranged.

The circumferential main grooves G are not particularly limited, and one that is employed by a general heavy duty pneumatic tire can be used. For example, a groove width Wg of the circumferential main grooves G is preferably in a range of 6 to 15 mm on the tread surface 2S, a groove depth D thereof is preferably in a range of 8 to 16 mm, and various types of grooves such as straight grooves and zigzag grooves can be adopted.

In this example, the height La of the top portion P is preferably greater than the groove depth D of the circumferential main grooves G. Thus, since the protruding portion 11 does not disappear until the end of wear, wandering resistance performance can be exhibited. Preferably, the height La is equal to or more than 1.1 times the groove depth D, more preferably equal to or more than 1.2 times. When the groove depth D is different in each circumferential main groove G, the above-mentioned groove depth adopts the groove depth D of the circumferential main groove G arranged on the most tread grounding edge Te side (hereinafter referred to as "shoulder main groove Gs").

Figure 4:
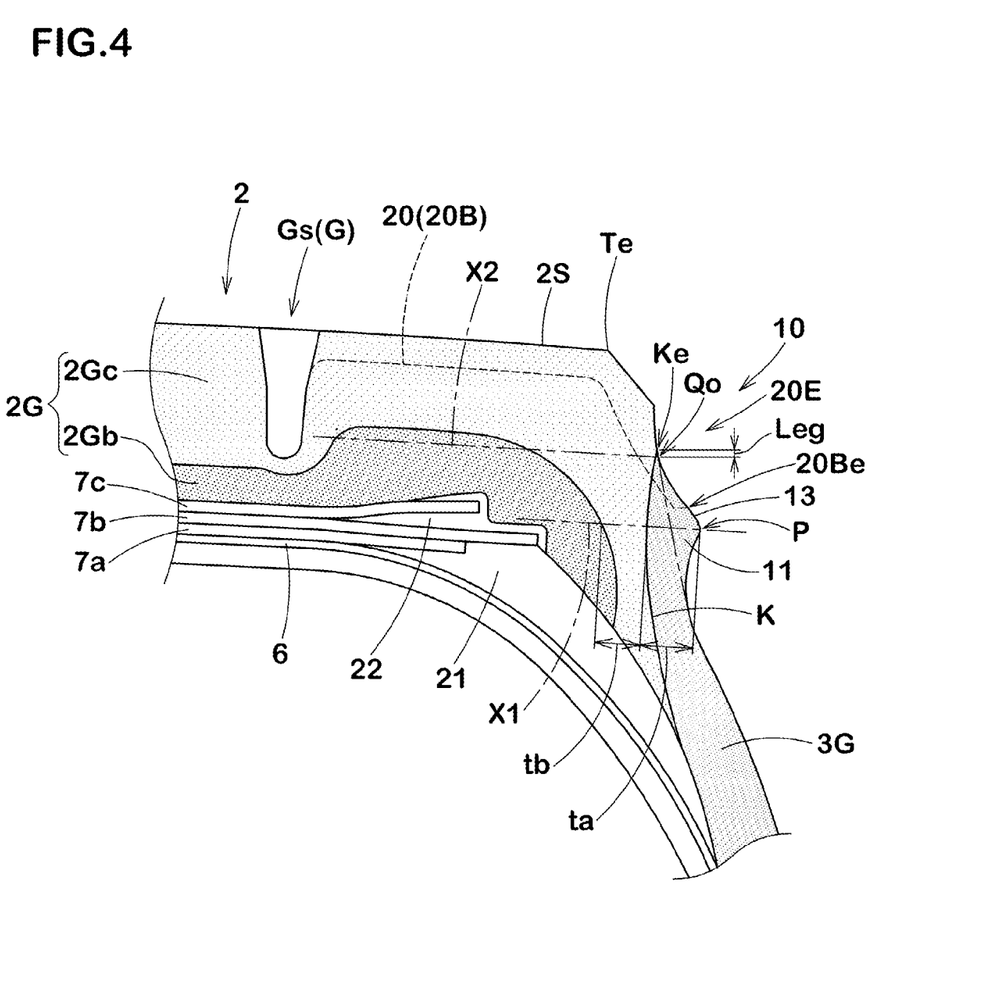
FIG. 4 is a partial cross-sectional view showing a positional relationship between an internal structure of the tread portion and the protruding portion.

As shown in FIG. 4, the tire 1 has an SOT structure in which an axially outer end portion of a tread rubber 2G is covered with a sidewall rubber 3G. The tread rubber 2G is a rubber forming the tread surface 2S. In this example, the tread rubber 2G include a cap rubber layer 2Gc outside the tire radial direction and a base rubber layer 2Gb being adjacent inwardly of the cap rubber layer 2Gc in the tire radial direction. In the tread rubber 2G, complex elastic modulus of the cap rubber layer 2Gc is preferably greater than complex elastic modulus of the base rubber layer 2Gb in order to exhibit excellent wear resistance performance. Further, loss tangent (tan $\delta b$) of the base rubber layer 2Gb is preferably smaller than loss tangent (tan $\delta c$) of the cap rubber layer 2Gc in order to reduce fuel consumption.

The sidewall rubber 3G is a rubber forming the sidewall surface 3S, and is disposed outwardly of the carcass 6 in the tire axial direction. The sidewall rubber 3G is made of a soft rubber having a complex elastic modulus smaller than that of the tread rubber 2G. In view of improving crack resistance and cutting resistance, loss tangent (tan $\delta s$) of the sidewall rubber 3G is preferably greater than the loss tangent (tan $\delta c$) of the cap rubber layer 2Gc and the loss tangent (tan $\delta b$) of the base rubber layer 2Gb. Note that complex elastic modulus and loss tangent of rubber are values measured by using a "viscoelastic spectrometer" under the following conditions, according to the specification of JIS-K6394:

initial strain (10%);
amplitude (+/−1%);
frequency (10 Hz);
deformation mode (tensile); and
measured temperature (70 deg. C.).

An outermost end Ke in the tire radial direction of a boundary surface K between the tread rubber 2G and the sidewall rubber 3G is exposed to an outward location in the tire radial direction of the top portion P of the protruding portion 11. That is, the sidewall rubber 3G extends outside in the tire radial direction beyond at least the top portion P. As a result, the buttress region 10 is more easily bent and deformed, and helps to improve wandering resistance performance.

In particular, the outermost end Ke of the boundary surface K is preferably positioned in the vicinity of the outer intersection Qo. Thus, the outer intersection Qo becomes a starting point to bent, and the buttress region 10 is more easily bent and deformed.

Figure 5A:
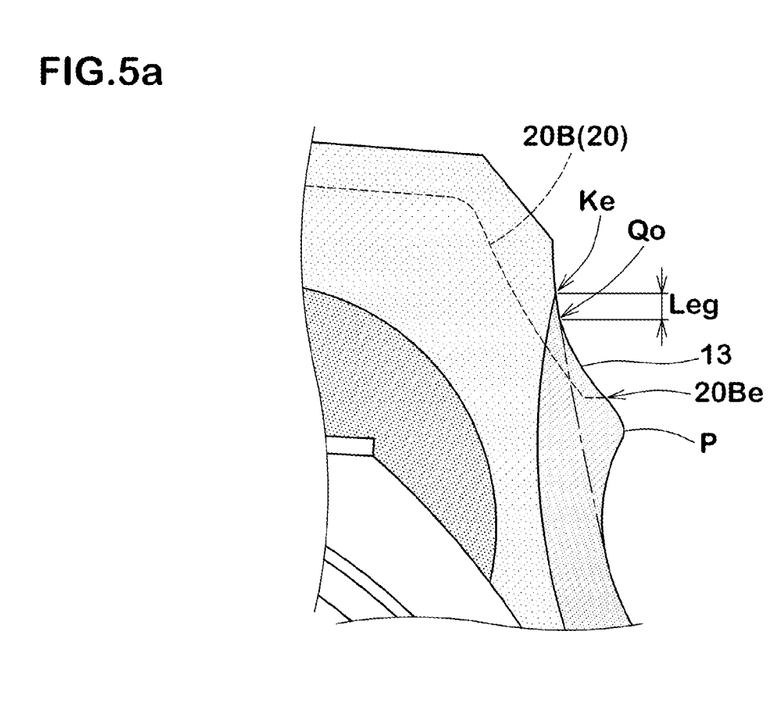
FIGS. 5A and 5B are partial cross-sectional views showing a positional relationship between a boundary line between a tread rubber and a sidewall rubber and the protruding portion.
Figure 5B:
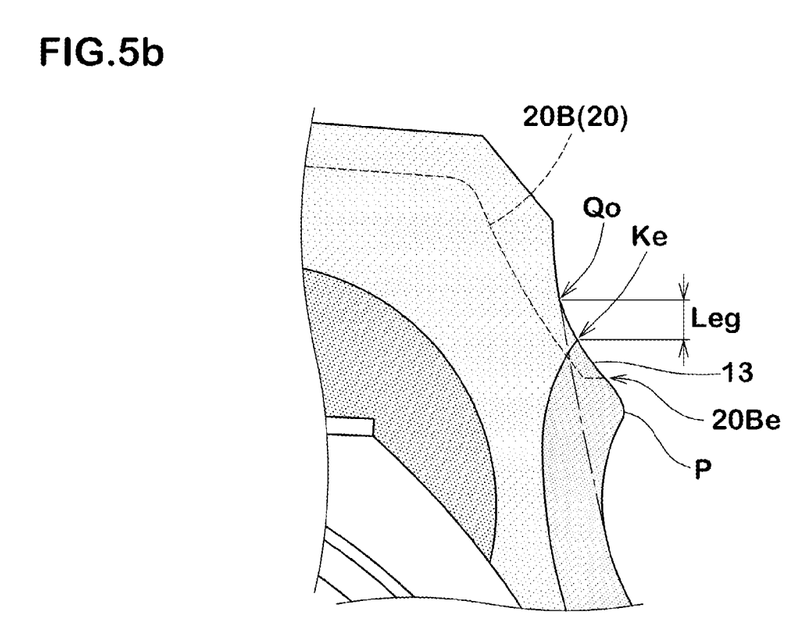

As shown in FIGS. 5A and 5B, it is desirable that a distance Leg in the tire radial direction between the outermost end Ke and the outer intersection Qo is less than 5 mm, preferably equal to or less than 4 mm, more preferably equal to or less than 3.0 mm. As long as the distance Leg is within the above range, the outermost end Ke may be located on the outside or inside the tire radial direction of the outer intersection Qo.

As shown in FIG. 4, on the first reference line X1 that extends in parallel with the tread surface 2S passing the top portion P of the protruding portion 11, a thickness ta of the sidewall rubber 3G is equal to or less than 1.0 times a thickness tb of the cap rubber layer 2Gc, for example. More preferably, the thickness tb of the cap rubber layer 2Gc is greater than the thickness ta of the sidewall rubber 3G (i.e., ratio ta/tb<1.0). Thus, by regulating the ratio of the thickness of the sidewall rubber 3G and the cap rubber layer 2Gc on the first reference line X1, wandering performance can be further improved. The lower limit of the ratio ta/tb is not particularly limited, but is preferably equal to or more than 0.80, more preferably equal to or more than 0.90.

Further, it is preferable that the second reference line X2 that extends in parallel with the tread surface 2S and passing the outer intersection Qo traverses the base rubber layer 2Gb. Thus, heat generation during traveling of the tread portion 2 is reduced, and low fuel consumption can be further promoted.

Furthermore, the tread portion 2 includes one or more shoulder lateral grooves 20. The shoulder lateral grooves 20 extend outwardly beyond the tread grounding edge Te in the tire axial direction, and axially outer ends 20E thereof open at the buttress region 10. In this example, inner ends of the shoulder lateral grooves 20 in the tire axial direction are connected to the shoulder main groove Gs. Alternatively, the inner ends of the shoulder lateral grooves 20 may terminate between the shoulder main groove Gs and the tread grounding edge Te.

Groove bottoms 20B of the outer ends 20Be of the shoulder lateral grooves 20 are located on the outer inclined surface 13 of the protruding portion 11. In other words, the groove bottom 20B intersect the outer inclined surface 13. Such shoulder lateral grooves 20 partially cut out the protruding portion 11. Thus, stiffness of the protruding portion 11 is reduced, and wandering resistance performance can be improved.

Note that reference 21 in FIG. 4 is a belt cushion rubber, and reference 22 is an edge cover rubber. The belt cushion rubber 21 has a triangular cross section and is interposed between the outer end of the belt layer 7 and the carcass 6. The belt cushion rubber 21 prevents damage by suppressing movement at the outer end of the belt layer 7. The edge cover rubber 22 is made of a thin rubber, and covers at least the outer ends of the second and third belt plies 7b and 7c to prevent ply end peeling.

Although some particularly preferred embodiments of the present invention have been described in detail, the present invention may be modified to various aspects without being limited to the illustrated embodiment.

EXAMPLES (A)

Pneumatic tires for heavy load (275/80R22.5) having a structure shown in FIG. 1 were prototyped on the basis of the specification of the Table 1. Then, wandering resistance performance and uneven wear resistance of each prototype tire were tested. Each test tire has substantially the same specification except for the specifications of the protruding portion 11 shown in Table 1.

(1) Wandering Performance Test:

Each test tire set was mounted on all wheels of a vehicle under the condition of a rim (22.5×7.50), an internal pressure (900 kPa), and a load (33.8 kN), and was traveled on a rutted road surface of wandering test. The behavior of the vehicle going straight in the rut, entering the rut, escaping, etc. was evaluated by the driver's sensory evaluation by the 5-point method. The larger numerical value is excellent in wandering resistance performance.

(2) Uneven Wear Resistance Test:

The vehicle was traveled at an actual use speed for road test until wearing 50%. Then, the state of occurrence of shoulder wear on the shoulder portion after traveling was measured by visual observation and evaluated by a five-point method. The larger numerical value is excellent in uneven wear resistance.

δs) of the sidewall rubber 3G, the loss tangent (tan δc) of the cap rubber layer 2Gc and the loss tangent (tan δb) of the base rubber layer 2Gb was as follow:

tan δb<tan δc<tan δs.

Then, the same wandering resistance performance was tested as above, and the results are shown in Table 2.

TABLE 2

|  | Ex. 1 | Ex. 10 | Ex. 11 | Ex. 12 | Ex. 13 | Ex. 14 |
|---|---|---|---|---|---|---|
| Distance Leg (mm) | 0 | 3 | 5 | 7 | 0 | 0 |
| Ratio ta/tb | 0.95 | 0.95 | 0.95 | 0.95 | 1.10 | 0.95 |
| Exposure location |  | On outer |  |  | Outside outer |  |

TABLE 1

|  | Ref. 1 | Ref. 2 | Ref 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Maximum protrusion height ($h_{max}$) of protruding portion [mm] | 0 | 1 | 4 | 4 | 4 | 4 | 4 | 3 | 4 | 4 | 6 |
| Ratio $h_{max}$/Wi(*1) | — | 0.008 | 0.035 | 0.035 | 0.035 | 0.035 | 0.035 | 0.025 | 0.035 | 0.035 | 0,0.50 |
| Cross-sectional area (Sa) of protruding portion [mm$^2$] | — | 10 | 12 | 35 | 35 | 35 | 35 | 25 | 40 | 50 | 45 |
| Radius of curvature Ri of first arc surface [mm] | — | 15 | 10 | 15 | 15 | 15 | 15 | 15 | 25 | 40 | 30 |
| Radius of curvature Ro of second arc surface [mm] | — | 15 | 10 | 15 | 15 | 15 | 15 | 15 | 25 | 40 | 30 |
| Ratio La/Lb (*2) | — | 1 | 1 | 1 | 1.5 | 0.9 | 1.1 | 1 | 1 | 1 | 1 |
| ratio La/D (*3) | — | 1.4 | 1.4 | 1.4 | 2.3 | 1.1 | 1.5 | 1.4 | 1.4 | 1.4 | 1.4 |
| Wandering resistance performance | 3 | 3 | 3 | 5 | 4 | 4.5 | 4.5 | 4 | 4 | 3.5 | 3.5 |
| Uneven wear resistance | 3 | 3 | 3 | 5 | 4 | 4 | 4 | 4 | 4 | 3.5 | 3.5 |

(*1) Wt: tread half width
(*2) La: height in tire radial direction from tread grounding edge to top portion of protruding portion
Lb: height in tire radial direction from tread surface to an outer surface of axially outer edge of second belt ply
(*3) D: groove depth of circumferential main groove As shown in Table 1, the tires of Examples 1 to 8 can be confirmed to exhibit excellent wandering performance.

(B)

Example 1 of Table 1 is used as a reference, the following examples were also prototyped.

a) Examples 10 to 12

These examples were configured that the outermost end Ke of the boundary surface K between the tread rubber 2G and the sidewall rubber 3G is positioned outwardly in the tire radial direction with respect to the outer intersection Qo where the protruding portion 11 intersects the imaginary buttress surface J and that the distance Leg in the tire radial direction between the outermost end Ke and the outer intersection Qo was modified.

b) Example 13

This example was configured that the ratio ta/tb of the thickness ta of the sidewall rubber 3G to the thickness ta of the cap rubber layer 2Gc on the first reference line X1 was modified.

c) Example 14

This example was configured that exposure locations of the outer ends 20Be of the groove bottoms 20B of the shoulder lateral grooves 20 were located outwardly in the tire radial direction with respect to the outer intersection Qo.

Note that each test tire, as shown in FIG. 4, has a SOT structure. Further, a relationship among the loss tangent (tan TABLE 2-continued

|  | Ex. 1 | Ex. 10 | Ex. 11 | Ex. 12 | Ex. 13 | Ex. 14 |
|---|---|---|---|---|---|---|
| of outer ends of groove bottoms of shoulder lateral grooves |  | inclined surface |  |  | intersection Qo in tire radial direction |  |
| Wandering resistance performance | 5 | 4.75 | 4.5 | 4 | 4.5 | 4.5 |

REFERENCE SIGNS LIST

1 Heavy duty pneumatic tire
2 Tread portion
2G Tread rubber
2Gc Cap rubber layer
2Gb Base rubber layer
2S Tread surface
3 Sidewall portion
3G Sidewall rubber
3S Outer surface of sidewall portion
7 Belt layer
7a First belt ply
7b Second belt ply
10 Buttress region
11 protruding portion
12 Inner inclined surface
12r First arc surface
13 Outer inclined surface 13r Second arc surface
20 Shoulder lateral groove
20B Groove bottom
20Be Outer end
20E Outer end
G Circumferential main groove
J Imaginary buttress surface
K Boundary surface
Ke Outermost end
P Top portion
Qi, Qo Intersections
Te Tread grounding edge

The invention claimed is:

1. A heavy duty pneumatic tire comprising a tread portion having a tread surface and a sidewall portion connected to the tread surface through a buttress region, wherein
the buttress region is provided with a protruding portion protruding outwardly in a tire axial direction and extending in a tire circumferential direction,
in a tire meridian cross-sectional view, a maximum protrusion height (hmax) of the protruding portion, with respect to an imaginary buttress surface in which outer surfaces other than the protruding portion in the buttress region are smoothly connected, is equal to or more than 3.0 mm and is in a range of 0.025 to 0.050 times a tread half width (Wt),
a cross-sectional area (Sa) of the protruding portion from the imaginary buttress surface is equal to or more than 20 $mm^2$,
the protruding portion has a triangular cross-sectional shape comprising a top portion defining the maximum protrusion height ($h_{max}$), a radially inner inclined surface and a radially outer inclined surface each of which extends to the imaginary buttress surface from the top portion while decreasing its protrusion height,
the tread portion is provided with a circumferential main groove extending in the tire circumferential direction with a groove depth (D), and at least one shoulder lateral groove having axially an outer end opening at the buttress region,
the at least one shoulder lateral groove comprises a first groove bottom extending in parallel with a tread surface, and a second groove bottom extending inwardly in a tire radial direction from the first groove bottom to the outer end opening at the buttress region,
a groove depth of the first groove bottom is smaller than the groove depth (D) of the circumferential main groove, and
the outer end of the at least one shoulder lateral groove is located on the outer inclined surface of the protruding portion.

2. The heavy duty pneumatic tire according to claim 1, wherein
the inner inclined surface comprises a first arc surface that is connected to the imaginary buttress surface smoothly and that has a concave arc shape with radius of curvature (Ri),
the outer inclined surface comprises a second arc surface that is connected to the imaginary buttress surface smoothly and that has a concave arc shape with radius of curvature (Ro), and
the radii of curvature (Ri) and (Ro) are greater than 10 mm and smaller than 30 mm.

3. The heavy duty pneumatic tire according to claim 1, wherein
the tread portion comprises, inside, belt layers comprising a first belt ply and a second belt ply that are superimposed from inwardly in a tire radial direction toward the tread surface in this order, and
a height (La) in the tire radial direction from a tread grounding edge to the top portion of the protruding portion is in the range of 0.9 to 1.1 times a height (Lb) in the tire radial direction from the tread surface to an outer surface of an axially outer edge of the second belt ply.

4. The heavy duty pneumatic tire according to claim 1, wherein
the tread portion is provided with a circumferential main groove extending in the tire circumferential direction with a groove depth (D), and
a height (La) in the tire radial direction from a tread grounding edge to the top portion of the protruding portion is greater than the groove depth (D) of the circumferential main groove.

5. The heavy duty pneumatic tire according to claim 1, wherein
the tread surface near a tread grounding edge and the buttress region are not provided with any narrow grooves extending continuously in the tire circumferential direction.

6. The heavy duty pneumatic tire according to claim 1, wherein
the tire has an SOT structure in which an axially outer end portion of a tread rubber forming the tread surface is covered with a sidewall rubber forming an outer surface of the sidewall portion.

7. The heavy duty pneumatic tire according to claim 6, wherein
an outermost end in the tire radial direction of a boundary surface between the tread rubber and the sidewall rubber is exposed to an outward location in the tire radial direction of the top portion of the protruding portion.

8. The heavy duty pneumatic tire according to claim 7, wherein
a distance in the tire radial direction between the outermost end of the boundary surface and an outer intersection of the protruding portion with the imaginary buttress surface is less than 5 mm.

9. The heavy duty pneumatic tire according to claim 7, wherein
the tread rubber comprises a cap rubber layer forming the tread surface and a base rubber layer being adjacent inwardly of the cap rubber layer in the tire radial direction, and
on a first reference line (X1) that extends in parallel with the tread surface passing the top portion of the protruding portion, a thickness (ta) of the sidewall rubber is smaller than a thickness (tb) of the cap rubber layer.

10. The heavy duty pneumatic tire according to claim 9, wherein
the sidewall rubber has loss tangent (tan δs) being greater than loss tangent (tan δc) of the cap rubber layer.

11. The heavy duty pneumatic tire according to claim 9, wherein
a second reference line (X2) that extends in parallel with the tread surface and passing an outer intersection of the protruding portion and the imaginary buttress surface traverses the base rubber layer.

12. The heavy duty pneumatic tire according to claim 11, wherein
loss tangent (tan δs) of the sidewall rubber is greater than loss tangent (tan δb) of the base rubber layer.

13. The heavy duty pneumatic tire according to claim 1, wherein
the tread portion comprises a tread rubber comprising a cap rubber layer forming the tread surface and a base rubber layer adjacent inwardly of the cap rubber layer in the tire radial direction, and
both the first groove bottom and the second groove bottom extend in the cap rubber without contacting the base rubber.

14. The heavy duty pneumatic tire according to claim 1, wherein
the inner inclined surface comprises a first arc surface that is connected to the imaginary buttress surface smoothly and that has a concave arc shape with radius of curvature (Ri), the first arc surface occupying at least 60% of the inner inclined surface, and
the outer inclined surface comprises a second arc surface that is connected to the imaginary buttress surface smoothly and that has a concave arc shape with radius of curvature (Ro), the second arc surface occupying at least 60% of the outer inclined surface.

15. The heavy duty pneumatic tire according to claim 1, wherein
the inner inclined surface comprises a first arc surface that is connected to the imaginary buttress surface smoothly and that has a concave arc shape with radius of curvature Ri,
the outer inclined surface comprises a second arc surface that is connected to the imaginary buttress surface smoothly and that has a concave arc shape with radius of curvature Ro, and
the radius of curvature Ri is equal to the radius of curvature Ro.

* * * * *